United States Patent [19]

Schuster

[11] Patent Number: 4,681,225

[45] Date of Patent: Jul. 21, 1987

[54] GLASS AND BOTTLE TOTE

[76] Inventor: Lorenz M. Schuster, 2163 Iglehart Ave., St. Paul, Minn. 55104

[21] Appl. No.: 874,515

[22] Filed: Jun. 16, 1986

[51] Int. Cl.⁴ .............................................. B65D 85/44
[52] U.S. Cl. .................................... 206/426; 206/523; 206/594; 206/545; 206/591; 383/97; 383/66
[58] Field of Search ............... 206/426, 523, 594, 545, 206/591; 383/97, 66

[56] References Cited

U.S. PATENT DOCUMENTS

| | | | |
|---|---|---|---|
| 1,194,466 | 8/1916 | Berg | 206/591 |
| 2,757,790 | 8/1956 | Gattuso | 206/591 |
| 3,070,281 | 12/1962 | Durkin et al. | 206/591 |
| 3,120,319 | 2/1964 | Buddrus | 206/523 |
| 3,181,693 | 5/1965 | Freistat | 206/523 |
| 3,263,806 | 8/1966 | Ring | 206/523 |
| 4,330,073 | 5/1982 | Clark | 206/523 |
| 4,383,565 | 5/1983 | Denmat | 206/523 |
| 4,428,484 | 1/1984 | Rattay et al. | 206/548 |

Primary Examiner—Joseph Man-Fu Moy
Attorney, Agent, or Firm—James V. Harmon

[57] ABSTRACT

The invention provides a wine glass or bottle tote having a cylindrical body of self-supporting foam rubber with a longitudinally extending cylindrical central passage having openings at each end for the insertion and removal of articles such as wine glasses or a wine bottle. A cloth cover is provided and a slippery cloth liner extends through the cylindrical opening. A circular cover having a zipper closes each end of the central passage to protect articles inside.

7 Claims, 6 Drawing Figures

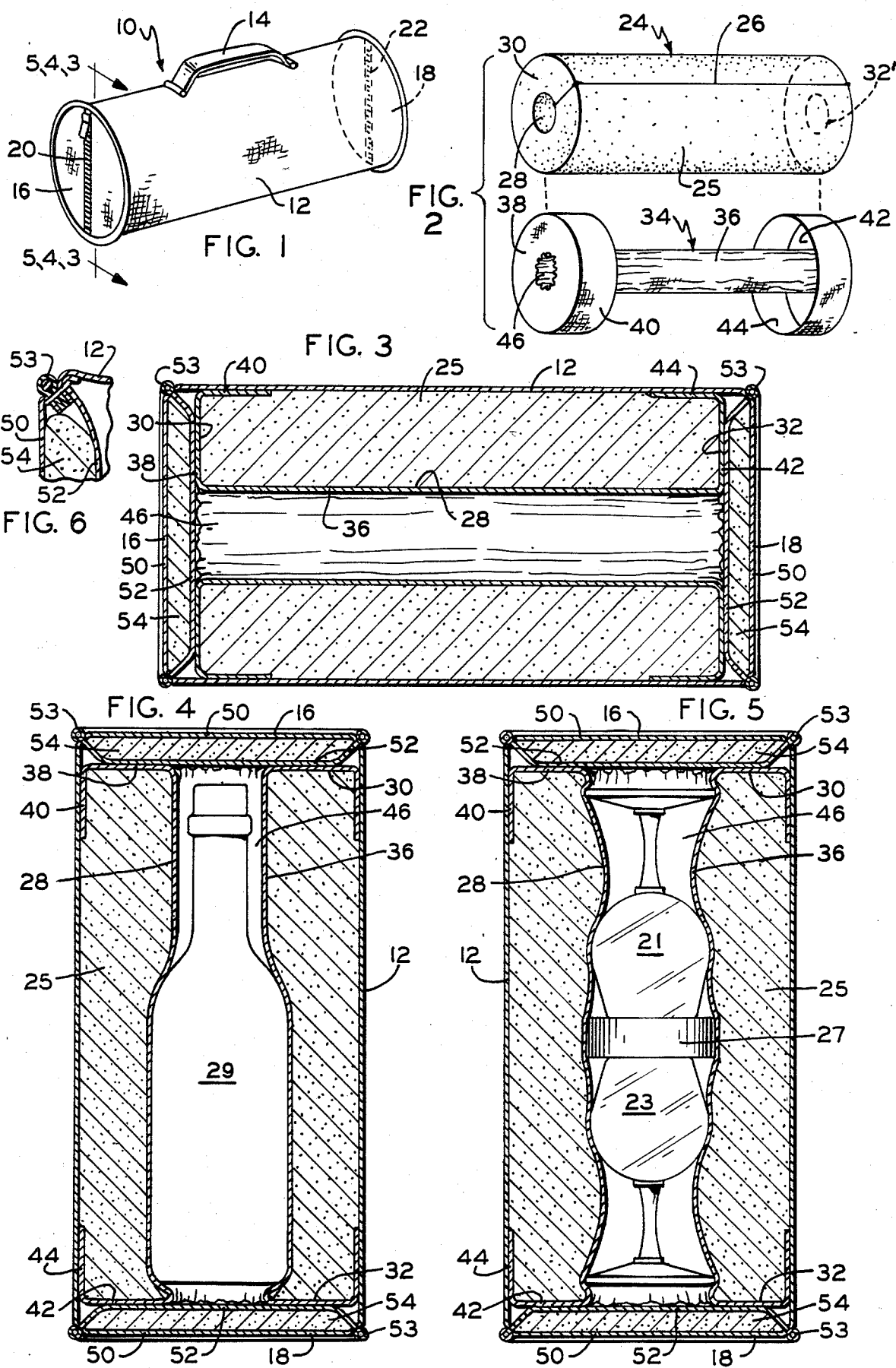

GLASS AND BOTTLE TOTE

FIELD OF THE INVENTION

The present invention relates to a carrying receptacle or tote for glassware such as wine glasses.

BACKGROUND OF THE INVENTION

While a great many carrying cases of various kinds have been provided for delicate articles, no satisfactory lightweight and inexpensive protective case has been provided which will protect both bottles and drinking glasses from impacts, for example as a result of being dropped.

The increased sales and mounting interest in wine as a beverage and the popularity of wine tasting parties has become more prevalent. As a result, there has developed a need for a simple and inexpensive carrying case for wine glasses and wine bottles. In the past, carrying cases have been improvised from cardboard boxes. Boxes, however, are not flexible and soft to the touch and do not cushion the enclosed article on all sides. Paper and cardboard only fit one size wine glass and an improvised box of this kind is difficult to carry or to use for both glasses and bottles. Leather cases previously used were designed to carry a one ounce shot glass and were not suitable for wine glasses. Bags in the nature of shopping bags have been previously used, but wine bottles carried in such bags can shift about or fall out in case the bag is laid on its side.

In view of these deficiencies of the prior art, it is a major objective to provide an improved wine glass and bottle tote having the following characteristics and advantages:

Capability of containing and adequately protecting both wine glasses and wine bottles,
Capability of cushioning the contents effectively from impact that results, for example, from their being dropped,
A soft exterior that is comfortable to carry,
Adaptability to articles of different sizes,
Provision for separating two or more glasses, and
Capability of being collapsed for storage.

These and other more detailed and specific objects of the invention will become apparent in view of the accompanying specification and drawings which indicate but a few of the various ways in which the present invention can be practiced within the scope of the appended claims.

THE FIGURES

FIG. 1 is a perspective view of the glass and bottle tote.

FIG. 2 is a perspective view of the padding roll and padding liner.

FIG. 3 is a vertical transverse sectional view taken on line 3—3 of FIG. 1 on an enlarged scale.

FIG. 4 is a view similar to FIG. 3 showing a wine bottle in place.

FIG. 5 is a view similar to FIG. 4 showing wine glasses being transported and

FIG. 6 is a partial vertical sectional view of the left end of FIG. 3 on an enlarged scale to show the details of the structure.

DETAILED DESCRIPTION

As seen in FIGS. 1 and 2, the tote indicated generally by the numeral 10 includes a cylindrical body enclosed within a cylindrical cover 12 usually cloth such as Cordura TM nylon to which is secured as by sewing a carrying handle 14 of strong durable cloth. At each end of the cylindrical tote body are covers 16 and 18 of circular shape which may also be made of cloth, e.g., nylon cloth at the center of which are provided releasable fasteners or closures such as zippers 20 and 22 for closing the covers 16 and 18 at each end of the tote 10. As shown in FIGS. 2-5, the body of the tote 10 is formed from a hollow self-supporting cylinder or tube of soft resilient material composed preferably of foam rubber or plastic which will be referred to collectively simply as foam rubber. A self-supporting tube 24 is made by starting with a flat sheet of foam rubber, say about two inches thick, bending it around a mandrel (not shown) and bonding the ends together with a suitable adhesive to form a longitudinally extending bond 26. The tube body 24 is characterized by being highly resilient and yet capable of maintaining its cylindrical shape. It is also very light in weight as excellent cushioning characteristics. Moreover, it cushions the contents uniformly on all sides and is capable of holding articles of different sizes owing to its ability to stretch and conform to surface contours. As shown in FIG. 2, the tubular body 24 includes a longitudinally extending centrally located tubular passage having openings 28 and 32 at opposite ends.

To facilitate the insertion and removal of articles, a liner 34 is provided. The liner 34 preferably comprises a slippery cloth such as slippery nylon cloth. The nylon cloth liner 34 includes a tubular center section 36 connected at each end to annular end faces 38 and 42. At the outer edges of the end faces 38 and 42 the cloth is folded centrally to provide circular sleeves 40 and 44 which extend over the outside end portions of the tubular cushion 24 as shown in FIGS. 3-5. The sleeves 40 and 44 are sewn or otherwise securely fastened to the cylindrical cover 12.

Covers 16 and 18 are each formed from outer and inner cloth layers 50 and 52 respectively within which is supported an end cushion such as a disk of foam rubber 54. It should be understood that the end covers 16 and 18 including the inner and outer walls 52 and 50 and the foam rubber padding 54 are divided into two halves by the zippers 20 and 22 so that articles can be easily introduced and removed. Sewn into the tote at each end as shown in FIGS. 3 and 6 at the intersection between the cover 12 and the end walls 16 and 18 is a circle of decorative piping 53 which may be of a contrasting color.

As seen in FIGS. 2 and 3, the central tubular portion 36 of the liner 34 is drawn together in longitudinally extending folds or puckers so that it is capable of expanding considerably when articles are inserted through either of the openings 46 at opposite ends of the tote. The end faces 38 and 42 of the liner 34 are also important particularly during the first stages of insertion by serving to promote a smooth sliding action between the tote and the article, particularly during the first stages of insertion as the foam rubber body 24 is stretched outwardly around the opening 28.

A single bottle such as a wine bottle 29 can be inserted into the tote through the opening provided by the open zipper 20 in the cover 16 as shown in FIG. 4, after which the zipper 20 is zipped shut.

As shown in FIG. 5, the tote 10 can also be employed for holding a pair of glasses such as wine glasses 21 and 23 which are inserted longitudinally into the elongated central opening 46. The wine glasses 21 and 23 are separated by means of a divider wall 27 having the shape of a disk or foreshortened cylinder preferably composed of plastic foam or the like. As can be seen in FIG. 5, the divider wall 27 will be reliably held in place by the resiliency of the surrounding layer of cushion material 25 and normally will remain in place indefinitely when the tote is in use as the glass 21 is removed and reinserted through the end cover 16 and the glass 23 is removed and reinserted through the end cover 18. If it is desired to use the tote for a bottle such as bottle 29, the divider 27 is removed by hand and the bottle 29 is inserted. When in place, the divider 27 will reliably prevent the glasses from striking one another.

From the foregoing description, it can be seen that the tote provides excellent protection for wine glasses and bottles. It will accommodate different size wine glasses but will also carry and protect the wine bottle alone.

Many variations within the scope of the appended claims will be apparent to those skilled in the art once the principles described herein are understood.

What is claimed is:

1. A carrying case for delicate articles such as glasses or bottles comprising,
    an elongated container body having a first end and a second end,
    said container body being formed from a self-supporting body of foam rubber which itself serves as a supporting structure for the case having an elongated tubular opening extending from said first end to said second end and communicating with each end through an opening therein,
    said tubular opening being somewhat smaller in diameter than the size of a typical article to be contained therein whereby each segment along a longitudinal axis of the foam rubber body will be forced in sequence to stretch outwardly over the article as the article is introduced through one of said openings and portions of the foam rubber body thereby extending centrally into depressions, if any, in the delicate articles thereby at least in part conforming to the surface contours thereof,
    a slippery liner contained within a logitudinally extending opening,
    said liner being capable of extending outwardly as the article is inserted and being slippery enough to allow the article to slide through the enclosing foam rubber body as segments thereof sequentially expand and contract thus conforming to its surface as the article is inserted, and
    a compressible and collapsible cover at each end of the carrying case extending across the opening at each end thereof and each cover including a releasable closure means for opening the cover to facilitate insertion and removal of articles into the elongated passage.

2. The wine glass and wine bottle tote of claim 1 wherein a removable divider wall is releaseably held within the tubular opening in the tube by surface conformation thereto of the foam rubber at the center thereof and transverse to a central axis of the tote to separate the hollow tubular opening within the tote into two chambers, each adapted to contain a single wine glass.

3. The carrying case of claim 1 wherein the covers each comprise a layer of foam rubber padding to protect the ends of an article within the carrying case.

4. The carrying case of claim 3 wherein the closure comprises a zipper extending across each of the covers to separate the padding into two padding bodies joined at the zipper along substantially the center line of each cover.

5. The carrying case of claim 1 wherein the slippery liner located in the central passage extends radially outward over an end wall of the foam rubber body at each end thereof to provide a slippery surface to facilitate the initial expansion of the foam rubber body as one end of an article to be carried is forced into an opening at either end of the elongated passage while the foam rubber body is forced to stretch outwardly at the opening.

6. The carrying case of claim 5 wherein a cloth sleeve extends from an outer edge of said slippery cloth liner over the outside surface of the foam rubber body and is secured in place by being connected to an overlying layer of supple material enclosing the foam rubber body.

7. The article of claim 1 wherein a removable divider wall is releasably and removably mounted within the longitudinal passage and is held in place by the resiliency and surface conformation of the surrounding foam rubber material in a position transverse to a longitudinally extending axis at the center of the passage.

* * * * *